United States Patent
Dahl

(10) Patent No.: US 9,098,116 B2
(45) Date of Patent: Aug. 4, 2015

(54) OBJECT AND MOVEMENT DETECTION

(71) Applicant: Elliptic Laboratories AS, Oslo (NO)

(72) Inventor: Tobias Gulden Dahl, Oslo (NO)

(73) Assignee: Elliptic Laboratories AS, Oslo (NO)

( * ) Notice: Subject to any disclaimer, the term of this patent is extended or adjusted under 35 U.S.C. 154(b) by 0 days.

(21) Appl. No.: 14/133,391

(22) Filed: Dec. 18, 2013

(65) Prior Publication Data

US 2014/0320390 A1 Oct. 30, 2014

Related U.S. Application Data

(63) Continuation of application No. 12/933,393, filed as application No. PCT/GB2009/000725 on Mar. 18, 2009, now Pat. No. 8,625,846.

(30) Foreign Application Priority Data

Mar. 18, 2008 (GB) .................................. 0805053.6
Mar. 19, 2008 (GB) .................................. 0805145.0

(51) Int. Cl.
*G06F 3/01* (2006.01)
*G06F 3/043* (2006.01)
*H04L 25/02* (2006.01)

(52) U.S. Cl.
CPC .............. *G06F 3/017* (2013.01); *G06F 3/043* (2013.01); *G06F 2203/04106* (2013.01); *G06F 2203/04108* (2013.01); *H04L 25/0204* (2013.01); *H04L 25/0242* (2013.01)

(58) Field of Classification Search
USPC ........... 382/100, 103, 106, 107; 348/169–172
See application file for complete search history.

(56) References Cited

U.S. PATENT DOCUMENTS

| 5,645,077 | A | 7/1997 | Foxlin | |
|---|---|---|---|---|
| 5,875,257 | A * | 2/1999 | Marrin et al. | 382/107 |
| 6,745,389 | B1 | 6/2004 | Hostyn et al. | |
| 7,308,286 | B2 | 12/2007 | Felter | |
| 7,536,029 | B2 | 5/2009 | Choi et al. | |
| 7,627,139 | B2 * | 12/2009 | Marks et al. | 382/103 |
| 8,321,219 | B2 * | 11/2012 | Mozer | 704/236 |
| 2003/0156756 | A1 * | 8/2003 | Gokturk et al. | 382/190 |
| 2006/0161871 | A1 | 7/2006 | Hotelling et al. | |
| 2006/0238490 | A1 * | 10/2006 | Stanley et al. | 345/156 |
| 2007/0121097 | A1 | 5/2007 | Boillot | |
| 2008/0130948 | A1 * | 6/2008 | Ozer | 382/103 |

(Continued)

FOREIGN PATENT DOCUMENTS

WO WO 2004/102301 A2 11/2004
WO WO 2006/067436 A1 6/2006

OTHER PUBLICATIONS

International Search Report and Written Opinion dated Aug. 3, 2009 from International Patent Application No. PCT/GB2009/000725, filed on Mar. 18, 2009.

*Primary Examiner* — Anand Bhatnagar
(74) *Attorney, Agent, or Firm* — Beyer Law Group LLP

(57) ABSTRACT

Motions, positions or configurations off, for example a human hand can be recognized by transmitting a plurality of transmit signals in respective time frames; receiving a plurality of receive signals; determining a plurality of channel impulse responses using the transmit and receive signals; defining a matrix of impulse responses, with impulse responses for adjacent time frames adjacent each other; and analyzing the matrix for patterns (22) corresponding to the motion position or configuration.

31 Claims, 5 Drawing Sheets

(56) References Cited

U.S. PATENT DOCUMENTS

| | | | |
|---|---|---|---|
| 2008/0159596 A1* | 7/2008 | Li et al. | 382/107 |
| 2008/0281523 A1* | 11/2008 | Dahl et al. | 702/5 |
| 2009/0198354 A1* | 8/2009 | Wilson | 700/90 |
| 2011/0096954 A1* | 4/2011 | Dahl | 382/103 |
| 2012/0033856 A1* | 2/2012 | Flagg et al. | 382/103 |
| 2013/0258113 A1* | 10/2013 | Binder | 348/169 |

* cited by examiner

Filter tap No.  Time slot

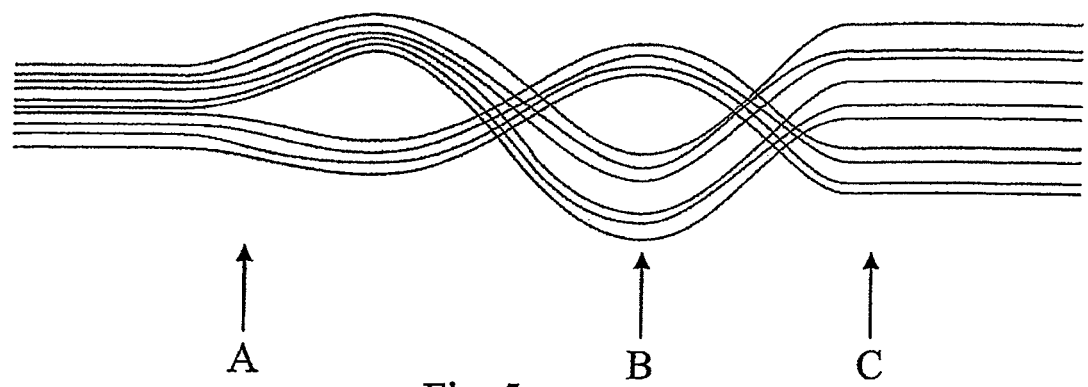
A  Fig. 5  B  C
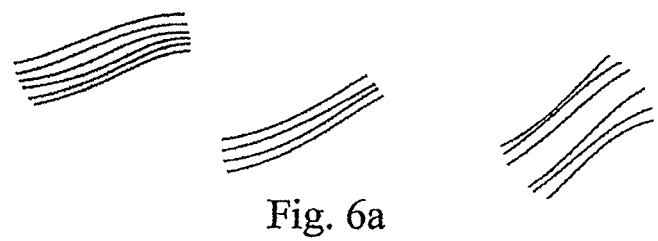
Fig. 6a
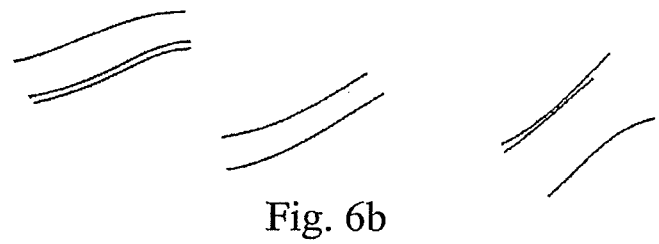
Fig. 6b
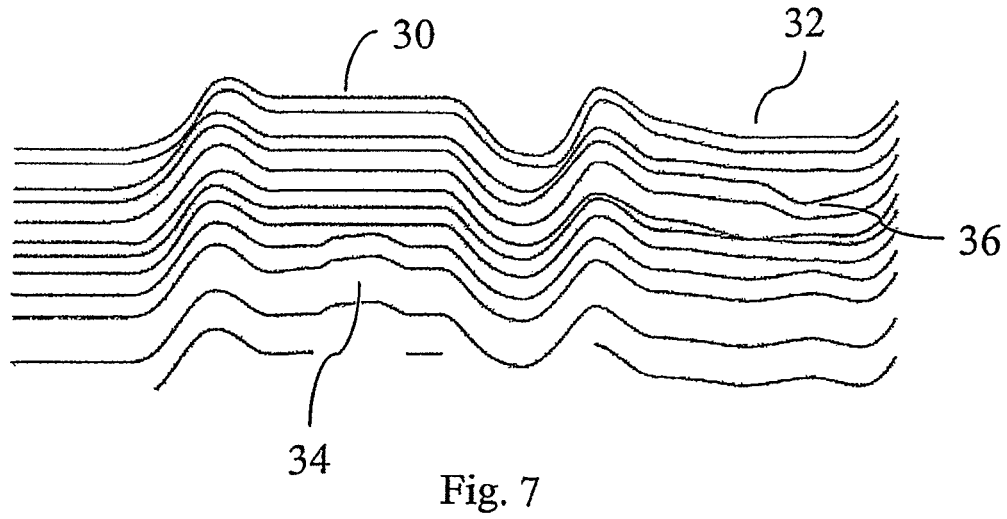
Fig. 7

OBJECT AND MOVEMENT DETECTION

This application is a continuation of U.S. application Ser. No. 12/933,393, filed on Dec. 14, 2010, which is a National Phase of PCT/GB2009/000725, filed Mar. 18, 2009, which was published in English and designated the U.S., and claims priority to GB 0805053.6, filed Mar. 18, 2008 and to GB 0805145.0, filed Mar. 19, 2008, each of which is incorporated herein by reference in its entirety.

This invention relates to the detection, location and/or tracking of one or more objects particularly, although not exclusively, using ultrasound.

It is known that it is possible to track one or more objects with an ultrasonic transmitter and an array of receivers using time-of-flight measurements combined with triangulation or other geometrical intersection techniques. As with most imaging technologies, the resolution increases with the number of sensors used. In particular to give sufficient resolution to enable the separation of signals coming from one object from signals from another requires a large number of sensors. With a large enough array of sensors therefore it can be seen that it would be possible to track multiple objects, such as the fingers on a hand, for interaction with a personal computer. Indeed various proposals for such tracking have been made—e.g. in US patent application US 2006/0161871 by Apple or US 2007/0121097 by Navisense. However both of these proposals have shortcomings. In particular using a large number of sensors to give accurate tracking of multiple objects gives rise to a high degree of system complexity and significant costs.

The present invention aims to take a different approach.

When viewed from a first aspect the invention provides a method of recognising motion of a human hand comprising:
transmitting a plurality of transmit signals in respective time frames;
receiving a plurality of receive signals, at least some of said receive signals being reflected from said hand;
determining a plurality of channel impulse responses using said transmit and receive signals;
defining a matrix of impulse responses, with impulse responses for adjacent time frames adjacent each other; and
analysing said matrix for patterns corresponding to movement of said hand.

The invention extends to apparatus for recognising motion of a human hand comprising:
transmission means arranged to transmit a plurality of transmit signals in respective time frames;
receiving means arranged to receive a plurality of receive signals at least some of said receive signals being reflected from said hand; and
processing means arranged to determine a plurality of channel impulse responses using said transmit and receive signals, define a matrix of impulse responses, with impulse responses for adjacent time frames adjacent each other, and analyse said matrix for patterns corresponding to movement of said hand.

The invention also extends to a computer software product, and to a carrier bearing the same, configured, when run on a computer, to recognise motion of a human hand, the software having inputs for a plurality of transmit signals in respective time frames and a plurality of receive signals and further comprising logic arranged to: determine a plurality of channel impulse responses using said transmit and receive signals; define a matrix of impulse responses, with impulse responses for adjacent time frames adjacent each other; and analyse said matrix for patterns corresponding to one or more objects.

Thus it will be seen by those skilled in the art that in accordance with the invention a matrix is constructed in which movement of the hand is represented by patterns corresponding to the impulse responses arising from reflections from the hand in successive timeframes. This allows, in various embodiments of the invention, recognition of the movement of a human hand to allow that movement to be used in a control interface without any physical contact being required—i.e. a touchless interface. The movement recognition could be for example: to track the motion of a finger; to look for a gesture executed by the whole hand; to look for a change in the shape, orientation or configuration of the hand; or indeed any combination of these things. The significant benefit which many of the aspects and features disclosed herein help to achieve is that the motion recognition mentioned above can be achieved without high imaging resolution; tolerance to the noise and inherent ambiguities which arise from much lower resolutions can be successfully accommodated.

The inventive concept also encompasses recognising movement of an inanimate object controlled by the hand, or of objects other than a human hand, e.g. another human body part or part of an animal's body. It also encompasses recognising specific positions, shapes, and configurations rather than movements. Thus when viewed from a second aspect the invention provides a method of determining the state of one or more objects in an imaging field comprising:
transmitting a plurality of transmit signals in respective time frames;
receiving a plurality of receive signals;
determining a plurality of channel impulse responses using said transmit and receive signals;
defining a matrix of impulse responses, with impulse responses for adjacent time frames adjacent each other; and
analysing said matrix for patterns corresponding to one or more objects.

The invention thus extends to apparatus for determining the state of one or more objects in an imaging field comprising:
transmission means arranged to transmit a plurality of transmit signals in respective time frames;
receiving means arranged to receive a plurality of receive signals; and
processing means arranged to determine a plurality of channel impulse responses using said transmit and receive signals, define a matrix of impulse responses, with impulse responses for adjacent time frames adjacent each other, and analyse said matrix for patterns corresponding to one or more objects.

The invention similarly also extends to a computer software product, and to a carrier bearing the same, configured, when run on a computer, to determine the state of one or more objects in an imaging field, the software having inputs for a plurality of transmit signals in respective time frames and a plurality of receive signals and further comprising logic arranged to: determine a plurality of channel impulse responses using said transmit and receive signals; define a matrix of impulse responses, with impulse responses for adjacent time frames adjacent each other; and analyse said matrix for patterns corresponding to one or more objects.

In preferred embodiments of the invention the method and software are used to control an electronic device which, to give some non-limiting examples could be a computer, PDA, cell phone, display equipment, audio-visual equipment or sound reproduction equipment. The invention thus extends to an electronic device controlled by the methods and software disclosed herein.

The nature of the transmit signals can be selected as appropriate. In a simple embodiment they could comprise a single impulse or spike, i.e. approximating a Dirac delta function within the limitations of the available bandwidth. This has some advantages in terms of requiring little, if any, processing of the 'raw signal' to calculate impulse responses (in the theoretical case of a pure impulse, no calculation is required) but gives a poor signal-to-noise ratio because of the deliberately short transmission. In other embodiments the transmit signals could be composed of a series or train of pulses. This gives a better signal-to-noise ratio than a single pulse without greatly increasing the computation required. In other embodiments the transmit signals comprise one or more chirps—i.e. a signal with rising or falling frequency. These give a good signal-to-noise ratio and are reasonable for calculating the impulse responses using a corresponding de-chirp function applied to the 'raw' received signal.

The matrix could be a logical construct comprising data recorded in a memory or other storage medium of a computing device; equally it can be seen as an image, with the values of the matrix corresponding to brightness levels in the image. In either representation, conveniently the impulse responses for respective time frames are aligned so that the responses for stationary objects are represented by horizontal lines. However this is not essential; for example the sampling scheme and so matrix need not be quadratic or rectangular; it could be a different shape such as hexagonal. In general the matrix is made up of samples of the impulse response at different times, where the impulse response is itself a function of time.

The Applicant has realised that by organising the impulse responses such that they can be represented as an image (whether or not they in fact are so represented), powerful analysis of the image can be employed to deduce useful information about the object(s). When such analysis is discussed hereinbelow reference will be made to impulse response images; however it should be understood by those skilled in the art that such analysis can equally be carried out on data in a matrix, whether it is stored as such or whether it is a purely logical construct, and that nothing herein should be construed as inherently limiting the invention to requiring production of an actual image or any other representation.

Where reference is made herein to impulse responses and impulse response images, these terms are to be understood to include simple linear transformations of the received impulse responses, such as inverted or linearly scaled transformations thereof. The terms impulse response and impulse response image in the following should therefore be construed to encompass all such equivalents.

In some known systems object tracking is carried out by comparing consecutive pairs of reflected signals (e.g. by comparing their phase) This can be thought of as the "raw signal" domain. The Applicant has appreciated however that by carrying out tracking in the impulse response image domain in accordance with the invention, significant advantages can be realised. For example there is less of a requirement to separate a large number of small pulses or to find leading edges of waves than there is when operating in the 'raw signal' domain. The preferred embodiments of the invention allow an overview of a 'scene' to be taken which then allows better qualified estimates to be made of the identity of parts of the image with the particular objects and their movement, as opposed to simply carrying out a 'search' operation at any given time.

The patterns in the impulse response 'images' corresponding to objects and their movement will typically be made up of the impulse responses from a number of consecutive time intervals. By contrast with simple maxima, minima, zero phase points or column-pair phase or time delays, the use of patterns in accordance with the invention allows more accurate and reliable analysis of trends within the image, which in turn allows reliable identification, location and/or tracking of objects. In some embodiments of the invention the impulse response images allow multi-frame motion estimation to be conducted—that is motion estimation where motion is not simply computed from frame-to-frame and then possibly averaged over the frames, but rather wherein the motion is computed using several frames right from the start. This can be seen effectively as performing 'synthesis before extraction' and is fundamentally different from previous techniques in which data was extracted on the fly' and then filtered, averaged or otherwise smoothed.

However this is not essential in some aspects of the invention. The impulse response images also allow motion estimation where possible movements are computed for multiple objects and/or multiple pixels within a single object, whether it is computed for pairs of impulse response or for multiples: multi-pixel/multi-candidate motion estimation. Such motion estimation may use impulse response samples from two or more consecutive times. In practice, our research has shown that different points on the surface of the object can have different motion patterns due to the size and orientation of the object. If, for instance, a hand is moving along a straight line with constant speed closely in front of a receiver/transmitter setup, a reflective point or partial object on one side of the hand does not have the same series of distances to the receiver/transceiver setup as a point or a partial object on the other side does.

By contrast, some prior art techniques are based on computing the phase delay of a signal from one frame to the next. This assumes that there is a single, "average" phase delay, or phase delay "of the centroid", which is representative of the object as a whole. However the Applicant has found that this is often not an accurate assumption, depending on the shape of the object being tracked. Ambiguities can result, such as unwanted artifacts on the tracking curves, which can lead to confusion about the motion of an object position and hence to incorrect position estimation, particularly when 2D or 3D positions are computed.

Hence, at least some embodiments of the invention can provide motion information for multiple reflective points or parts of objects in the impulse response image, the motion of these points being related to the movement of particular locally 'bright' or 'dark' pixels from one column of the impulse response matrix to the next. This "motion of the pixel" in the impulse responses can also be likened to an optical flow field.

The impulse response image can, in accordance with preferred embodiments, therefore use multiple frames to track a single (effectively point) object, or use two or more frames to track multiple objects or multiple parts of an object of finite size; or indeed any combination of these.

This approach can be contrasted with some prior art tracking approaches which effectively just try to locate an object at one time point and then to track its movement by looking for the change in location by the next time point, e.g. using phase-delay techniques. The phase delay is computed for pairs of impulse responses, then this is averaged over time. However, since each such pair-wise comparison is sensitive to noise and errors (particularly if there are bursts of noise causing noise impulse responses), the variance of this process tends to grow over time (even though it might have zero mean). The result is a tendency for drift in the tracked timesof-flight on each channel to occur, which could lead to even more severe artifacts when an attempt is made to combine these positions to determine a two-dimensional or three-dimensional position in space. Although there are several ways in which such drift can be corrected for, the embodiments of the present invention are beneficial in avoiding such drift and therefore obviating the need to apply such corrections.

Furthermore the prior art approaches cannot cope adequately with the tracked object passing too close to another object in the field. Moreover, they cannot cope adequately when two objects are at similar time-of-flight distances as each other from a transmitter-receiver pairing, even if the objects are not close to each other in space. The present invention, at least in its preferred embodiments employing multi-frame motion estimation, has an advantage over the error-prone state-of-the-art pair-wise comparison of echoes or impulse responses, by instead using several echoic impulse responses together.

In preferred embodiments the patterns comprise intensity contours. Clearly the fine structure of such contours will be dependent on the nature of the transmit signal; and they might not be static as interference between overlapping lines might give rise to flicker. However the contours can, preferably, be approximated by lines. Such lines could be straight or curved and in some preferred embodiments the lines themselves are approximated by a plurality of line segments.

In a simple application, embodiments of the invention could be used for presence detection—e.g. by looking for sufficiently prominent lines in a predetermined region of the image to indicate an object. The nature of the lines—e.g. their spread or pattern—could be used for determining a property of the object—e.g. its size, shape or reflectivity compared to surrounding objects. In general when there is an object present in the imaging field the impulse response image will contain features with both energy and a definite direction (e.g. horizontal for stationary objects and angled for moving objects); whereas noise tends to have energy but no discernible direction.

If, as is preferred, stationary objects are represented as horizontal lines in the impulse response image, moving objects will be represented by non-horizontal lines. Movements that extend or shorten at a constant rate the time-of-flight from the transmitter to an object and back to the receiver will be represented as straight lines at an angle to the horizontal, whereas other motion will be represented by curves. The Applicant has realised as a consequence that analysis of these lines can be used to determine the motion of objects. Moreover it has further realised that by applying some simple rules derived from the physical principles of the objects' movement, the movement of multiple objects can be tracked, even with insufficient resolution to be able to distinguish objects at any given instant.

The motion of the objects can be seen as a key principle in allowing them to be separated without what would normally be considered sufficient resolution to enable them to be separately imaged, indeed even if the objects are overlapping. This stems from the observation that the process of echo location is linear: the echoes from one object are superposed on top of those of another, making the total image a sum of "transparent" impulse response images stemming from the motions of the various reflectors in the scene. Thus the preferred embodiments of the invention use multi-frame transparent motion estimation. A simple way of visualising this is to consider different text printed onto transparent sheets which are laid on top of each other. If the sheets are static relative to one another it is likely to be difficult or impossible to read any of the text. However if they have relative movement, they are much easier to read.

The concept of using motion to separate closely-spaced or overlapping objects can be seen as enhancing poor resolution in the spatial domain by exploiting higher resolution in the time domain.

When viewed from a further aspect the invention provides a method of tracking an object in the presence of one or more other objects in an imaging field comprising transmitting energy into said imaging field, receiving reflected energy from the imaging field, calculating a series of impulse responses at successive time intervals and selecting a subset of said impulse responses corresponding to a continuous motion. The invention extends to apparatus configured to carry out such a method and to a computer software product configured to carry out the aforementioned calculating and selecting steps.

The transmitted energy may be intermittent (regularly or irregularly), e.g. in the form of individual pulses, pulse trains, chirps, etc.; or it may be continuous.

What this means is that, at least in its preferred embodiments, the invention can allow the movement of multiple objects to be tracked with fewer sensors than would otherwise have been the case. Techniques in accordance with the invention effectively allow detection of motion, even of overlapping objects, without full imaging being necessary. A pattern in the impulse response image corresponding to motion of the first object can be separately identified and isolated as a subset (e.g. a line) of the impulse response image. This is effectively deconstructing the composite image into separate layers corresponding to the separate motions. Of course where the patterns for the objects overlap, part of the image 'subset' referred to above will also belong to a corresponding 'subset' for the motion of the other object.

To take an example of the application of physical principles to impulse response images, if say the objects being tracked are fingers on a hand, intelligent estimates can be made about movements by considering only continuous movements, below a certain speed and/or acceleration. This can be translated into properties of the lines in the impulse response image: lines which are continuous; which have a gradient below a threshold; and possibly which have a curvature below a threshold. This last criterion could be applied as a maximum change in gradient for best-fit linear sections. Of course, different gradients and different thresholds may apply for each of the different 'channels' in a system having more than one transmitter-receiver pair.

There are many ways in which the impulse response images can be analysed to determine motion of objects. In some circumstances a relatively crude analysis might be sufficient. For example the system might be configured to detect an aggregate change in the impulse response, or a predetermined portion thereof, above a threshold, without needing to determine the precise nature of the change or the movement that caused it. To take just one example of this, it might be determined that if an impulse response changes by more than say 10% over a given period, it is to be interpreted as a movement.

If more discriminating analysis is required, there are many different approaches that can be used. For example any set of filters or linear or non-linear transforms can be used, including but not limited to: curvi-linear filters, Hough-transforms, radon transforms, pi-tau transforms, and Fourier or fractional Fourier transforms, applied to the whole impulse response image or parts thereof. In another alternative, projection approaches can be employed by matching sub-blocks or sliding sub-blocks of the images to a set of basis image blocks.

In another alternative an adaptive filter or any other suitable mathematical technique can be applied in order to 'deconstruct' the two or more layers corresponding to the motions of two or more objects.

In a further alternative the images can be represented using functional data analysis. In yet another alternative the filters can be realized in the Fourier transfer domain, fractional Fourier transform domain, or time domain, involving shifted and moving averages of the impulse response columns. In some embodiments, the impulse response image may be transformed by an up-, down- or re-sampling filter. In certain embodiments, a filter may be applied to the received signal (i.e. the 'raw' signal domain) before conversion to the impulse response domain.

Several such analyses may be combined for a single impulse response image such that, for example, one or more filters is applied to the impulse response image; the resulting filtered image is transformed by, say, a wavelet transform; one or more further filters is applied to the transformed image; the inverse transform is applied; and one or more further filters is applied in the impulse response image domain.

The Applicant has appreciated, however, that performing certain analyses in the impulse response image (rather than in a transformed domain) is advantageous, for example in terms of computational simplicity, since stasis and motion of objects are more readily apparent from the impulse response image.

One set of preferred embodiments of the method comprise applying one or more line filters to the image. A line filter is an algorithm which enhances parts of the image which lie on a predetermined line relative to the rest of the image. This can be achieved by enhancing those parts from their original intensity, reducing the intensity of other parts, or a combination of the two. A further advantage of line filters is that they are effective for reducing the effect of spurious, temporary bursts of channel noise such as would give rise to 'bad columns' in the matrix and so which could confuse conventional time-of flight tracking systems.

In a preferred set of embodiments straight line filters are employed. These have the advantage of giving relatively simpler computations but can nonetheless be used to approximate non-linear motion through sequential curve-fitting should this be necessary. A single filter could be used—e.g. for a system looking for a particular movement only—but preferably a plurality of different filters is applied. The results achieved with the respective filters can then be compared to determine one or more 'winners'—i.e. those that give the strongest result overall or within a given area. A threshold result strength could be applied e.g. to avoid false matches if no object motion of interest is present.

Preferably the line filter masks are configured with a roll-off at the edges thereof; that is to say, rather than a sharp boundary, there is a decreasing differential enhancement away from the centre of the line, preferably both in a direction normal to the line (i.e. above and below the line if horizontal) and away from the ends of the line.

A simple line filter can be seen as a linear operation on an image, involving a sum or an average. However, one can envision simple or complex non-linear modifications to a filter, such as enhancing its performance by having an adaptive outlier-filter that removes columns, rows or pixels having a high probability of noise prior to the summing or averaging, to avoid the smearing of noise pixels onto other pixels.

Additionally or alternatively, edge filters are employed. In contrast to line filters, which match anywhere within the thickness of a linear band, an edge filter only matches one or both of the two boundaries of such a band. An edge filter will thus generally require the proximity of a high magnitude region and a low magnitude (i.e. close-to-zero) region (the magnitudes being the absolute values of the impulse responses). The edge filter may be horizontal, but is preferably at a predetermined angle. It will thus typically be useful in the early determination of motion of a predetermined type, since it will strongly match only the edge of a line within the impulse response image. This can correspond to detection of the front or back of an object and may be used effectively to locate, for example, a human finger.

Additionally or alternatively the columns of the filter mask could be convolved with a sinc signal representative of the bandwidth of the transmit signal. This allows information from neighbouring lines to be combined, thereby allowing a more visible line to be extracted.

Additionally or alternatively a complex filter could be employed which effectively captures both phase, direction and amplitude of object motion.

In some circumstances it might be appropriate for a filter mask to combine a plurality of lines in the impulse response image to give a fewer number of lines e.g. a single line. For example if an object of interest is moving near to a strong reflector, say a computer screen, the impulse response image would contain similar lines corresponding to signals reflected directly off the object; and those that had also been reflected via the screen respectively.

The Applicant has further appreciated that it is not always necessary to compute two-dimensional filter masks, which in some applications might require heavy computational resources; alternatives for example would be to apply rolling averages, infinite impulse response filters, or filters based on sub-band coding. It will be appreciate that such filters can still act on information from two or more successive impulse responses.

It is furthermore not essential to employ straight line filters. For example filters corresponding to specific curved lines, i.e. curvi-linear filters, could be applied instead or in addition. In another alternative, more complex masks could be used to look for specific movements, particularly in the case of multiple moving objects—e.g. in gesture recognition. An example of this would be a sinusoidal filter to detect a reciprocating object movement—e.g. waving of a hand.

However the Applicant has appreciated that instead of using a relatively complex shaped mask, patterns in the impulse response image can be determined by recording the order in which simple filters are matched to the impulse responses. This allows specific types of movement, such as gestures, to be detected by their corresponding patterns in the impulse response image, regardless of the particular position, orientation or speed of the gesture. Thus a set of preferred embodiments comprises recording a sequence of filters matched to respective portions of the impulse response image, and comparing said sequence to one or more predetermined sequences to identify a characteristic pattern in the impulse responses, e.g. corresponding to a particular gesture. The predetermined sequence could comprise specific predetermined filters, but preferably comprises a sequence of sets of filters where any filter from the correct set can satisfy the sequence.

In one example, if positive filter matches by a given series of filters comprising an upwardly sloping filter followed by a horizontal filter and then followed by a downwardly sloping filter, a regular motion such as oscillation may be deduced. This technique may be used to detect, for example, a gesture such as one or more human digits being wiggled rhythmically e.g. in a waving or beckoning gesture. Detecting such a specific gesture may enable a connected electronic system to perform a specific action in response to the gesture. This approach of identifying sequences of relatively simple filters amongst those matched would typically be computationally cheaper than applying one complex filter, such as a sinusoid line filter, particularly if this is done in addition to applying line filters which may be necessary for simply tracing the curve. It is also more versatile since, for example, a sinusoidal line filter will only match a narrow range of frequency of variation in the trace. This approach can be applied with line filters, edge filters, other filters capturing directional information about an object, or a combination of some or all of these.

In general the shape of a filter mask can be varied in a number of ways. For example as well as, or instead of, enhancing a particular line, it may be used to suppress, or suppress more strongly, a particular region of the impulse response image—e.g. that which corresponds to a known or previously-identified source of noise, interference or movement not of interest.

In its simplest embodiments, the invention can be used to give useful information regarding the presence or movement of single or multiple bodies using only a single transmitter and a single sensor/receiver. Preferably however a plurality of transmitters and/or a plurality of receivers is provided.

Some embodiments of the invention can use just a single transmitter and receiver pair. These could be physically separate transducers or could be provided by a single transducer. In at least some embodiments however a plurality of receivers is provided. Preferably an impulse response image is constructed for each sensor. One or more 'winning' lines could be determined from each of these images and the lines combined in some way to provide an overall line in 2D or 3D space. Preferably however filters, e.g. line filters, which are adapted from a common velocity conjecture for each specific sensor channel are applied. In other words the system preferably guesses a velocity for an object consistent with the previous trajectory and physical rules and converts this velocity conjecture into a set of line (or other) filters for each sensor channel. Each sensor channel requires a different filter for a given trajectory since each will give a slightly different change between one column of the impulse response image and the next depending on the different positions of the sensor relative to the object(s).

In at least some preferred embodiments multiple transmitters are used. In one set of preferred embodiments different delays are applied to the transmit signals for each sensor. With appropriately timed delays for each sensor depending on its location relative to the others for example, even omni-directional transmitters can together transmit a narrow 'beam' of transmit signals so that only objects in the path of the beam are detected or tracked. This is advantageous in allowing less overall transmitter power to be used, which is significant in the context of mobile, battery-powered devices. The reason for this is that the beam-forming gives greater selectivity and so less overall power is required to achieve a given minimum signal-to-noise ratio.

A similar concept can be applied to multiple sensors. Thus in some preferred embodiments comprising a plurality of sensors, an artificial delay is added to the impulse responses of at least some of the sensors so that the system is only sensitive to echoes emanating from within a corresponding beam defined by the locations of the sensors and the respective time delays. The direction of the beam can of course be changed adaptively by altering the pattern of delays applied. Its focusing properties can also be altered by applying suitable weightings. The direction of the beam is preferably determined based on a predicted motion of an object being tracked. As previously discussed such a prediction can be based on the previous trajectory and simple physical rules based on continuity of movement and maximum acceleration. As in the case of the multiple transmitters, such beam-forming effectively allows the suppression of signals that come from direction which are not of interest and so allow more accurate tracking of the object of interest.

In some embodiments, e.g. those where a relatively lower resolution is sufficient, the transmit signals in accordance with the invention could comprise discrete impulses interspersed with periods of non-transmission. In other embodiments, e.g. where greater resolution is required, continuous transmission is used. This could be regularly repeating, either on the period of the timeslots, a multiple thereof, or on another period. It should be understood that where continuous transmission is employed the timeslots could be a purely abstract construct with no relationship to the physical signals being transmitted. In such cases the "timeslots" are simply labels relating the impulse responses to particular sampling intervals when the impulse response image is constructed.

The impulse responses can be calculated using any suitable technique. For instance if discrete pulses are transmitted there may be sufficient time between them for echoes either not to interfere, or to interfere only to an extent that the signals can be separated by known techniques. Where the pulses are more closely spaced or continuous transmission is used, other methods can be used such as cross-correlation or the continuous inversion technique disclosed in WO 2006/067436.

The use of impulse response images for use in multi-frame, or multi-point, motion estimation is considered novel and inventive in its own right and thus when viewed from a further aspect the invention provides a method of determining the movement of one or more objects in an imaging field comprising:

transmitting a continuous or discontinuous transmit signal;
receiving a plurality of receive signals;
determining a plurality of channel impulse responses using said transmit and receive signals;
defining a matrix of impulse responses, with impulse responses for respective time intervals adjacent one another; and
isolating from said matrix a pattern corresponding to a motion of one of said objects.

The invention extends to apparatus for determining the state of one or more objects in an imaging field comprising:
transmission means arranged to transmit a continuous or discontinuous transmit signal;
receiving means arranged to receive a plurality of receive signals; and
processing means arranged to determine a plurality of channel impulse responses using said transmit and receive signals, define a matrix of impulse responses, with impulse responses for adjacent time frames adjacent each other, and isolate from said matrix a pattern corresponding to a motion of one of said objects.

The invention also extends to a computer software product, and a carrier bearing the same, configured, when run on a computer, to determine the state of one or more objects in an imaging field, the software having inputs for a continuous or discontinuous transmit signal and a plurality of receive signals and further comprising logic arranged to: determine a plurality of channel impulse responses using said transmit and receive signals; define a matrix of impulse responses, with impulse responses for adjacent time frames adjacent each other; and isolate from said matrix a pattern corresponding to a motion of one of said objects.

In accordance with all foregoing aspects of the invention the impulse response information can be analysed just in the time domain as already described. However additionally or alternatively in some preferred embodiments of the invention the impulse responses are analysed in the frequency domain. Preferably this is achieved by performing a Fourier transform, preferably a fast Fourier transform, on at least some of the impulse responses. The Applicant has realised that additional information can be obtained from such frequency domain analysis. For example a distinction can be made between rotational and translational movement of an object since rotational movement will give rise to a shift in the zero points of the amplitude spectrum (caused by destructive interference) whereas translational movement does not. Thus preferred embodiments comprise analysing the amplitude spectrum in the frequency domain.

Furthermore it has been realised that for a single object moving translationally the shape of the frequency spectrum (the relative amounts of energy at each frequency) will remain constant, albeit that the absolute energy levels will depend on distance to the transmitter/receiver. However if there are multiple objects moving the shape of the frequency spectrum changes over time. This information could be used, for example, to determine how to analyse movement in the time domain more accurately or more efficiently. Preferably therefore changes in the frequency spectrum over time are determined.

It has also been appreciated that if an object in the imaging field alters in size or shape during the time window of observation its frequency spectrum will change. For example a change in size might give rise to a shift in frequencies. This could be used for example in a simple algorithm to detect the unclenching of a hand from a closed to an open configuration without having to perform any detailed tracking of the positions of individual fingers.

Similarly if an object changes its shape, its corresponding frequency representation in the corresponding part of the impulse response image will also change. An application of the use of frequency information using a Fourier transform could simply be to detect that the object is or has been changing its shape. If the object changes its shape, such as a thumb being stuck out or pulled in, this will change the frequency spectrum and phase of the corresponding part of the impulse response. This in turn, can be taken as a command for a computer to perform a specific action, for example to treat the action as a mouse click. This is the corollary in the frequency domain of the previously discussed analysis in the time domain whereby a threshold level of change in the impulse response is detected, or whereby a sequence of 'hits' using appropriate filters is detected.

As is the case generally with time domain analysis, specific types of motion can be identified and/or objects tracked without knowing the size, shape or absolute position of the object using frequency domain analysis. This can be seen as a 'probabilistic' tracking approach in contrast with a point-by-point 'deterministic' tracking approach.

Frequency domain analysis is considered novel and inventive in its own right and thus when viewed from another aspect the invention provides a method of identifying a predetermined motion of an object comprising transmitting a transmit signal, receiving during a first time interval a first receive signal, determining a first frequency composition of said first receive signal, receiving during a second time interval a second receive signal, determining a second frequency composition of said second receive signal and determining whether a predetermined difference exists between said first and second frequency compositions.

The invention extends to apparatus for identifying a predetermined motion of an object comprising:
transmission means arranged to transmit a transmit signal;
receiving means arranged to receive during a first time interval a first receive signal and receive during a second time interval a second receive signal; and
processing means arranged to: determine a first frequency composition of said first receive signal; determine a second frequency composition of said second receive signal; and determine whether a predetermined difference exists between said first and second frequency compositions.

The invention also extends to a computer software product, and a carrier bearing the same, configured, when run on a computer, to identify a predetermined motion of an object, the software having inputs for a first receive signal during a first time interval and a second receive signal during a second time interval; the software further comprising logic arranged to: determine a first frequency composition of said first receive signal; determine a second frequency composition of said second receive signal; and determine whether a predetermined difference exists between said first and second frequency compositions.

The concept above could be extended to cover multiple signals, or multiple impulse responses, which are collected and analysed together. Just as in the time domain, the frequency domain representations of the impulse signals could be aligned, e.g. in a matrix, so that the analysis techniques described herein can be used; e.g. line filters could be used to extract the motion of minima or maxima in the spectrum pattern.

Other, intermediate domains between time and space, such as fractional Fourier domains or wavelet domains may be used for analysis, which can provide additional information about time or frequency aspects of the objects motion. Thus, from a further aspect, the invention provides a method for identifying a predetermined motion of an object comprising:
transmitting a transmit signal;
receiving during a first time interval a first receive signal and receiving during a second time interval a second receive signal;
transforming said first receive signal into a predetermined domain;
transforming said second receive signal into said domain; and
determining whether a predetermined difference exists between said first and second signals within said domain.

The invention extends to apparatus configured to carry out such a method and to a computer software product, and a carrier bearing the same, arranged to carry out the transforming and determining steps.

The domain may be the frequency domain as previously described, but may alternatively be a fractional Fourier domain, a wavelet domain, or any other suitable domain.

In a set of preferred embodiments the methods described herein are used to track the motion of a human hand or part thereof. Preferably this is used to control an electronic device, including but not limited to a device with a visual display, such as a computing device, mobile device, cell phone, PDA, laptop computer, desktop computer, television, music system, video camera, or any device, static or portable performing any combination of these or other functions. One particular, non-limiting example is tracking the movement of a user's finger to control a cursor on a computing device or other device with a graphical user interface (GUI).

In one set of particularly preferred embodiments a method in accordance with the invention comprises the step of identifying a hand gesture. There are many possibilities for these gestures—a few examples of which will be given below. It will be apparent however to those skilled in the art that there are many possible alternatives which the principles and advantages that can be achieved in accordance with embodiments of the invention make convenient or possible.

In one example the system is arranged to detect two fingers moving together or apart (i.e. converging or separating). Of course the mapping of particular gestures to the control of functions can be decided according to the particular application. However this gesture could conveniently be used for example to indicate that a screen object is to be zoomed out or in respectively. In a preferred example the aforementioned gestures are identified from different direction movements in respective halves or portions of an impulse response image. It will be appreciated that in accordance with this embodiment of the invention, such identification can be successfully carried out since the impulse response image allows motion identification with a relatively crude level of spatial resolution. Moreover, it is not necessary to determine the exact positions of any of the fingers of the hand. Instead, only the relative separating or converging need be determined using a 'probalistic tracking' approach (in contrast to precise 'deterministic tracking'). Some pre-filtering of the image could be used—e.g. by identifying areas of high reflection energy likely to correspond to finger tip movement.

In a set of embodiments, a change of shape of an object is detected in the time domain. In some embodiments this is achieved by monitoring for a predetermined deformation in the impulse responses. A deformation occurs when individual parts of an impulse response in a given timeframe deviate in an adjacent timeframe. This means that the impulse response from one timeframe cannot be matched to that from the next by a simple shift in the time direction. When viewed in an impulse response image, this appears as individual lines diverging or converging. By contrast lines representing a moving object which is not changing in shape maintain a constant separation between them. This technique is powerful as it does not rely on a deterministic approach in which individual parts of an object are tracked and then relative movement calculated; rather a generalised change of shape (including expansion or contraction) can be detected, regardless of position, orientation or even starting-shape. This makes it useful for detecting gestures without requiring the computational resource necessary for deterministic finger tracking.

Another way in which the ability to detect the configuration of a hand can be exploited is to use it to determine when movement should be tracked and when it should not. There is a general problem with touchless control systems in ensuring that the system responds only to deliberate commands and not to inadvertent movements near its zone of sensitivity. Several ways round this have been proposed. One is to use a physical structure or indication to a user as to where the boundaries of the sensitive zone lie, and to ignore movements detected as being outside the zone. Another approach is to define such a zone 'virtually', i.e. without physical structure delineating it, but to provide some sort of feedback when movement within the zone is detected. In accordance with some envisaged embodiments of the present invention however, the configuration of a hand can be used to determine whether a movement or gesture is to be interpreted by the system. To take one non-limiting example, the system could be configured to distinguish between an open hand and a closed hand with a single projecting finger, with only gestures or movement made with the hand in the latter configuration being tracked or interpreted. Such a concept significantly reduces the chance of inadvertent movement interpretation in a highly user-friendly manner.

When viewed from a further aspect the invention provides a touchless control system configured to be responsive to movements of a hand in a first configuration; but to ignore movements of the hand when the hand is in a second configuration.

In another example rotation of the hand is detected. This could be used for example in the control of a computer game. The impulse response image is likely to contain more overlapping lines in this instance, but in accordance with preferred embodiments such a movement can nonetheless be distinguished—e.g. with appropriately designed filters and/or using frequency domain analysis.

In another example movement of thumb is detected. This could be used for example to emulate the click of a computer mouse button. In the impulse response image such a movement would appear as a differential gradient amongst some lines (corresponding to the thumb) compared to the rest of a group (corresponding to the rest of the hand). This is an example of the feature described above whereby a predetermined deformation in the impulse responses is detected to determine a change in shape of an object. It demonstrates that methods in accordance with the invention can be used to track or detect movements in objects which have significant dimensions—in other words which cannot be approximated as point objects.

More generally the Applicant has appreciated that using motion of the thumb to prompt an action, such as that equivalent to a mouse click, in a computer interface is advantageous over previous proposals to use tapping of a pointing finger. The movement of the pointing finger during tapping can give rise to an unintended movement in the detected lateral location of the finger so causing a corresponding unintended movement of the cursor which might mean that the intended action is not carried out. This could be highly frustrating for a user.

When viewed from a further aspect the present invention provides apparatus for controlling a device comprising means for detecting movement of a first digit for controlling a first action of the device and means for detecting movement of a second digit relative to the first digit for controlling a second action of the device.

Preferably said first action comprises moving a selector between a plurality of alternative positions—this could for example be a cursor or a menu. Preferably said second action comprises an action corresponding to the position of said selector.

Preferably the first digit is an index finger. Preferably the second digit is a thumb. It has been found that an index finger can be used naturally for moving and pointing whilst a thumb is easy and natural to move independently of the fingers in a 'click' action. This is particularly natural when the hand is resting on a surface. In some preferred embodiments said second action is only carried out if it is determined that the first digit is static.

It can be seen that the means for detecting movement of a second digit relative to the first digit can use a probabilistic approach to detect the relative motion. By this is meant that it preferably does not detect relative motion by independently determining the absolute positions of the first and second digit and comparing these.

In general the foregoing demonstrates that in accordance with preferred embodiments of the invention certain types of movement such as: translation, or rotation; or relative movement between different parts of an object can be detected without having to know or measure the precise shape or size of the object. This has clear computational advantages but also means that a wide range of objects can be recognised with minimal, or no 'learning'.

As explained above, the technique of constructing impulse response images and analysing lines and shapes in these gives rise in the preferred embodiments of the invention to significant advantages. However one of the key principles used to carry out such analysis—using motion conforming to physical rules to separate overlapping or unresolved objects—can also be applied in other circumstances. For example in an imaging system 'unresolved' or overlapping objects can be identified or tracked. In such systems rather than impulse response images necessarily being constructed, the impulse responses across a number of channels (e.g. from a number of sensors) can be combined to produce, at each time interval, a two- or three-dimensional image of the objects' locations, or a two- or three-dimensional map of the reflectivity of all the reflective points in the scene. There are several beam-forming or imaging techniques which can be used in this context, but in some preferred embodiments delay-and-sum imaging is used.

The changes in such images can be analysed over time using the motion separation techniques described earlier. In other words the techniques can be applied to maps of the physical location of the objects as they can to impulse response images.

Thus when viewed from a further aspect the invention provides a method of identifying or tracking an object comprising continually or continuously transmitting transmit signals, receiving signals reflected from said object at a sensor at a plurality of time intervals, constructing an image based on the receive signals from said plurality of time intervals and analysing said image for one or more patterns corresponding a predetermined movement of said object.

The invention extends to apparatus for identifying or tracking an object comprising means for continually or continuously transmitting transmit signals, means for receiving signals reflected from said object at a sensor at a plurality of time intervals, and processing means configured to construct an image based on the receive signals from said plurality of time intervals and analyse said image for one or more patterns corresponding a predetermined movement of said object.

The invention also extends to a computer software product, and a carrier bearing the same, configured, when run on a computer, to identify or track an object, the software having an input for signals reflected from said object at a sensor at a plurality of time intervals and logic configured to construct an image based on the receive signals from said plurality of time intervals and analyse said image for one or more patterns corresponding a predetermined movement of said object.

As in the earlier aspects of the invention, the images can be compared using a line filter—i.e. selecting only those parts of the images which are consistent with the predetermined movement. Of course the analysis will typically use the results from more than two time intervals and this will of course enhance the accuracy with which an object can be tracked. Preferably a rolling window of time intervals is used.

One advantage of the physical mappings of reflectors is that the mapping process automatically deals with 'unphysical' or rogue data—e.g. from one channel—that is not consistent with that from the other channels (since they are receiving reflections from the same physical object). This effectively gives an element of pre-filtering of the data.

Also as in the earlier aspect of the invention the physical mappings of reflectors need not be visually represented but could comprise data from which a visual representation could be derived.

Any of the other features described herein as preferred or possible features of the earlier aspects of the invention can equally be applied to the physical images described above.

In all of the methods herein, the results are preferably stored in a volatile or non-volatile memory. Additionally or alternatively they are displayed on a display device. They thus preferably comprise the step of providing a display signal for a display device. Additionally or alternatively the methods are used to control an external device. They thus preferably comprise the step of providing a control signal for an external device.

The methods of the invention are preferably carried out using computing means, computing machines, data processing apparatus or any other device capable of carrying out stored instructions. Such a device may be static; although the invention can equally be used with mobile devices. Indeed the advantages achievable in accordance with at least some embodiments of the invention of intolerance to absolute orientation or position and the ability to separate different motions make it particularly suitable for use in mobile devices. When viewed from another aspect therefore the invention provides a mobile device comprising an ultrasonic transmitter and separate/integrated ultrasonic receiver, said device being configured so that at least one operation thereof is controlled by determination of the movement of a user's hand in accordance with any of the method set out hereinabove.

Whilst reference is made herein to arrangements in which signals are transmitted, reflected by an object and then received, the principles apply equally to 'active objects' i.e. where the object being detected or tracked itself includes a transmitter so that the signal originates from the object rather than being reflected by it.

In all aspects of the invention the signals are preferably ultrasonic signals. This means acoustic signals having a frequency higher than the normal human hearing range; typically this means the signals have a frequency, or base or median frequency greater than 20 kHz, e.g. between 30 and 50 kHz.

Certain preferred embodiments of the inventions will now be described, by way of example only, with reference to the accompanying drawings in which:

FIG. 5 is a schematic representation of the impulse response image corresponding to two objects moving across one another FIG. 6a shows the impulse response of FIG. 5 after a line filter has been applied;

FIG. 6b shows the impulse response of FIG. 5 after an edge filter has been applied;

FIG. 7 is a schematic representation of the impulse response image corresponding to a 'thumb click';

Figure 8A:
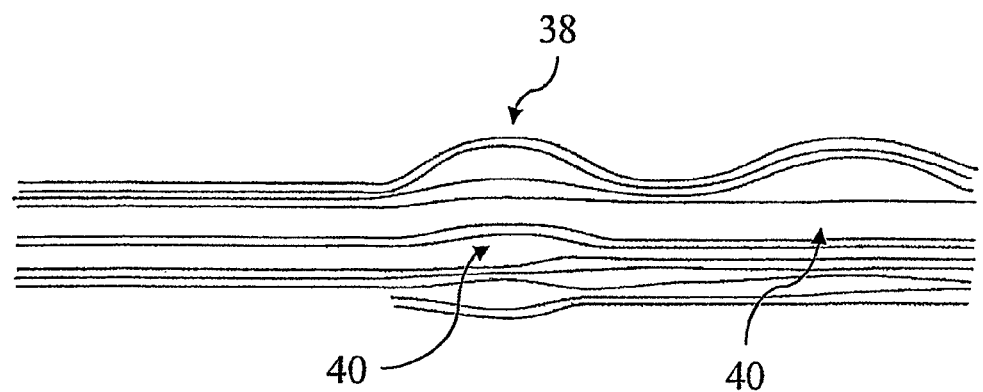
Figure 8B:
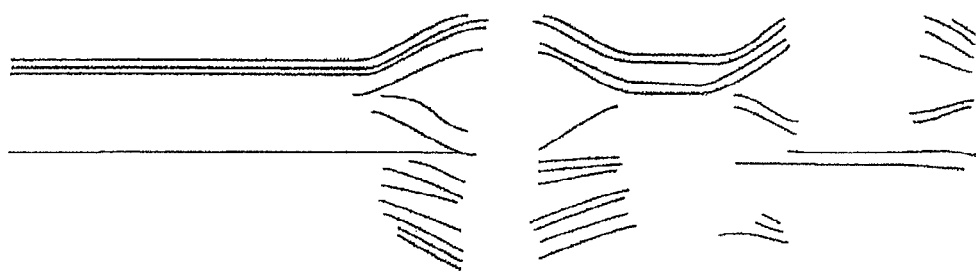
Figure 8C:
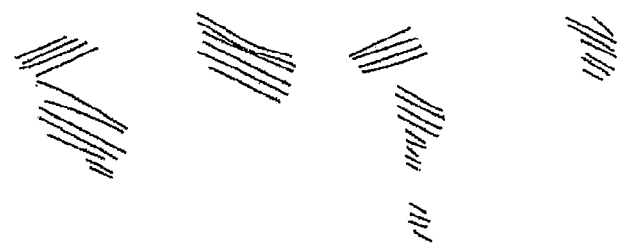

FIG. 8*a* is a schematic representation of the impulse response image corresponding to a 'zoom action';

FIG. 8*b* shows the impulse response image of FIG. 8*a* after applying line filters; and FIG. 8*c* shows the impulse response image of FIG. 8*b* after applying further line filters.

Figure 1:
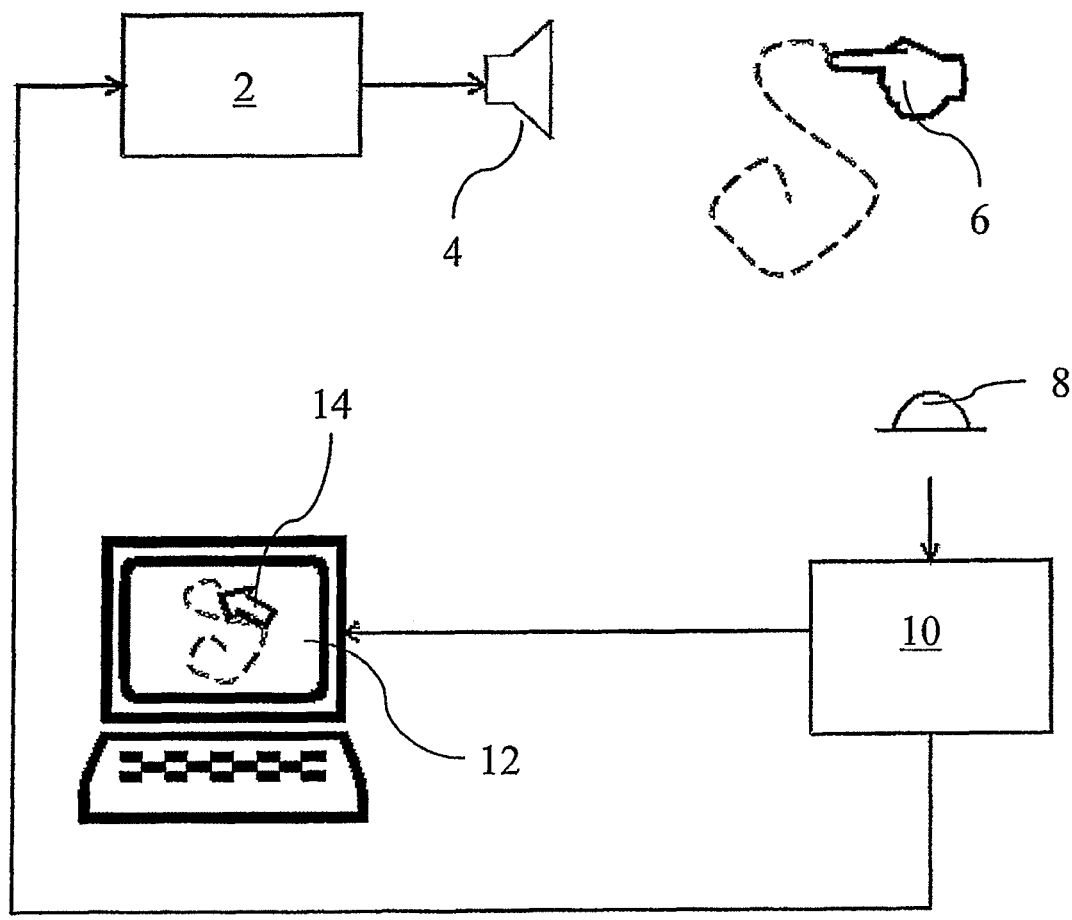
FIG. 1 is a schematic diagram showing the principal parts of a an ultrasonic multi-object tracking system.

Turning first to FIG. 1 an exemplary implementation of the principles of the invention to the touchless control of a graphical user interface of a computer, will be described. A signal generator 2 generates signals at ultrasonic frequencies which are converted to ultrasonic waves by an ultrasonic transmitter 4. These waves bounce off an object 6 to be tracked, such as a hand, as well as bouncing off any other obstacles in the vicinity. The reflected energy is received by one or more ultrasound receivers 8 which convert the energy back into analogue electrical signals which are passed to a processor 10. As will be explained in greater detail below, the processor 10 computes impulse responses, carries out filtering, combines impulse responses images to become 2D or 3D images etc, so as ultimately to determine the motion of the object 6. The information about the presence and position of the object 6 is passed to a display 12 for controlling the movement of a cursor 14. The display could be a separate system or indeed part of the computer on which the processor 10 is provided. The cursor 14 reproduces the motion of the object on the screen.

The processor 10 is coupled to the signal generator 2 in order for the processor to control the precise transmission times, signal codes or other patterns, should that be necessary.

The analogue signals output by the ultrasonic receiver 8 are used to calculate 'impulse responses' for the 'channel' comprising: the ultrasonic transmitter 4, the imaging field containing the object of interest 6 and the ultrasonic receiver.

One way of estimating the channel impulse response is to drive a short impulse into the signal and listen to received echoes and direct path energy being received. However, as it might be difficult to transmit such a signal without giving the transmitter a 'shock', containing frequency components outside the band in which the impulse response estimate is sought. Other techniques might be more appropriate, such as cross-correlation or pulse compression techniques.

It may first be assumed that the transmission of a signal over a channel follows the following model;

$$y(t)=h(t)*x(t)+n(t) \qquad \text{Eq(1)}$$

where:
x(t) is the signal transmitted
y(t) is the received signal
h(t) is the channel's impulse response
n(t) is an environmental noise term
* denotes a convolution operator The transmitted signal is represented as a time series—that is to say a series of discrete signal values at regular time intervals. The received signal is also represented as a time series since it will be a sampled signal. The impulse response h(t) is what is being sought to be measured. It is assumed that the channel h(t) is constant or changing very slowly relative to the changes in x(t) and y(t), at least within any actual time-window used. That is not to say that time-varying channels cannot be measured, indeed in at least its preferred embodiments the invention is concerned with how a channel varies over time; it is just that the channel variation should be slow compared with the signal variation.

The channel can be represented as a Q-tap finite impulse response (FIR) filter. As is well known in the art this is a construction in which the channel h(t) is seen as a series of weights to be applied to the previous Q time samples of the input signal. Assuming a signal x(t) has been transmitted through a loudspeaker, it is received through a microphone again as y(t). The received signal y(t) is taken to relate to the transmitted one x(t) as follows:

$$y(l) = [x(t) * h(t)](l) = \sum_{k=0}^{K-1} x(l-k)h(k) \qquad \text{Eq(A)}$$

That is, a sample of y(t) is a linear combination of the K last samples of x(t) where the linear weights are given in the "filter coefficients" h(0), . . . h(K−1). To estimate the channel, it is necessary to estimate these filter coefficients. In this technique the assumption is made that the signal x(t) is, for all t from—infinity to plus infinity, "white". In other words it is assumed that the signal is uncorrelated with itself for all non-zero shifts. Expressing this in an equation:

$$[x(t)*x(-t)](l) = \qquad \text{Eq(B)}$$
$$\sum_{k=-\infty}^{\infty} x(l-k)x(-k) = \sum_{k=-\infty}^{\infty} x(l+k)x(k) = \begin{cases} P & \text{if } l=0 \\ 0 & \text{otherwise} \end{cases}$$

where P is a real, positive number, assuming that x(t) has finite support, i.e. it is zero for large +/− values of t, and has finite values elsewhere. Convolving a signal with its own time-reverse is the same as correlation with the signal itself, i.e. computing the auto-correlation of the signal. So assuming that x(t) is indeed white, correlating x(t) with itself yields a positive value P for a time lag of 0 and zero everywhere else. Another way of writing this is:

$$x(t)*x(-t)=P\cdot\partial(t) \qquad \text{Eq(C)}$$

where $\partial(t)$ is the Dirac delta function. It is now assumed that Eq(B) also holds approximately around a point $t_0$ in time, with a length of N+1 samples and a time-window of x(t), so that:

$$[x(t)*x(-t)]_{t_0}(l) = \sum_{k=-N/2}^{N/2} x(l+t_0-k)x(t_0-k) = \qquad \text{Eq(D)}$$
$$\sum_{k=-N/2}^{N/2} x(l+k+t_0)x(k+t_0) \approx \begin{cases} P & \text{if } l=0 \\ 0 & \text{otherwise} \end{cases}$$

Convolving y(t) with x(−t) around $t_0$ gives:

$$[y(t)*x(-t)]_{t_0}(l) = \sum_{k=-N/2}^{N/2} y(l+t_0-k)x(t_0-k) \qquad \text{Eq(E)}$$

and calculating the inner term in the sum gives:

$$y(l+t_0-k) = \sum_{i=0}^{K-1} x(l+t_0-k-i)h(i) \qquad \text{Eq(F)}$$

and hence:

$$[y(t)*x(-t)]_{t_0}(l) = \sum_{k=-N/2}^{N/2} \sum_{i=0}^{K-1} x(l+t_0-k-i)h(i)x(t_0-k) = \quad \text{Eq(G)}$$

$$\sum_{i=0}^{K-1} \left[ \sum_{k=-N/2}^{N/2} x(l+t_0-k-i)x(t_0-k) \right] h(i) \approx P*h(l)$$

As can be seen from Eq(D) above, the term in the brackets in Eq(G) is P (approximately) if and only if l=i and (approximately) 0 otherwise. Hence by choosing l=1, the outcome of the convolution $[y(t)*x(-t)]_{t_0}(l)$ will be P times h(1), if l=2, then it is P times h(2) etc. In this way, the filter coefficients h(.) can be estimated by convolving windows of x(t) with windows of y(t) around a certain "centre" time sample $t_0$.

In situations where there are a lot of echoes, and where a frequent update of the impulse response is desired, the problem arises of echoes from a past output signal x(t) leaking into the received signals y(t) in the next frame. A way to overcome this problem is to use a driving signal x(t) where each subsection is as orthogonal as possible, i.e. has a zero cross-correlation function, with the other ones. When estimating the impulse response at a given time-step, correlation is only done with that part of x(t) which was output during the timespan of interest. In practice, it might be difficult to construct signals x(t) for which the windowed snapshots are orthogonal. In WO 2006/067436, a method was suggested for overcoming this problem, by using a different model for estimating the channel impulse response continuously, without the need for perfectly piecewise orthogonal signal sections of x(t). The present invention encompasses using this method, or any other method for estimating a sequence of impulse responses and subsequently collecting them in an impulse response image and using this for tracking, motion estimation, detection, or motion feature extraction.

Figure 2:
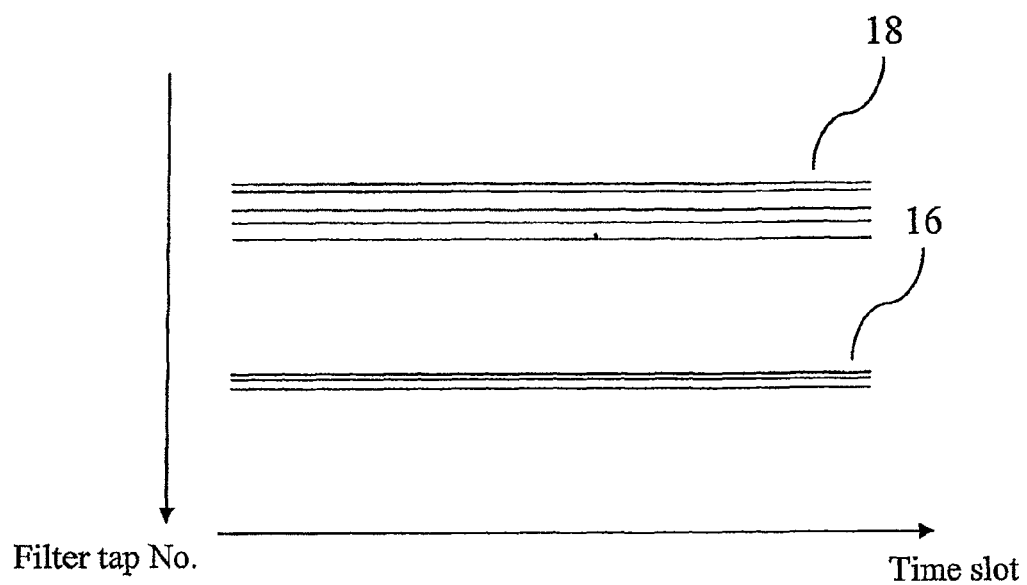
FIG. 2 is a schematic representation of an impulse response image representing a single static object.

The impulse responses, e.g. calculated as above, for a series of adjacent time-slots can then placed adjacent one another to form an impulse response image. A visual representation of a simple impulse response image is shown in FIG. 2. In a practical system such a visual representation would probably not actually be needed since the relevant analysis can be carried out on the calculated impulse responses without displaying them. Each vertical column of pixels in the image represents one sampling window or time-slot. Thus the vertical scale is filter tap number. The horizontal scale is sample number. The impulse response image can therefore be thought of as the result of chopping up a continuous time line of impulse responses in lengths equal to the length of the sample window, and placing the lengths next to each other.

In FIG. 2 shows schematically the impulse response image obtained (after a threshold filter has been applied to give enhanced clarity) with a single static object in the imaging field. The lower set of lines 16 are the impulse responses for the object, e, g, a hand. Since the object is static the impulse response is the same in each time slot and so the lines 16 are straight and horizontal.

The upper set of lines 18 correspond to the direct path signal, i.e. the signal going straight from the transmitter to the receiver. This contribution 18 of the direct path, and possibly also background reflections from e.g. parts of the apparatus, to the impulse response image can be conveniently removed in a number of ways. A simple way is to calculate a 'representative' column of impulse responses from a set of columns—which could for example be the mean, median or maximum likelihood column—and to subtract this from each of the columns. This is an improvement over known arrangements in which a blanking period is used between transmitting and receiving—i.e. impulse responses are not calculated for the first few filter taps in a given time-slot. The known arrangement is not ideal because there are situations in which overlap can occur between reflections from an object of interest and either the direct path or background reflections. Of course more advanced techniques could be used to separate in situations where the contribution of the direct path to the image overlaps with that of the echoes from a moving object.

Figure 3:
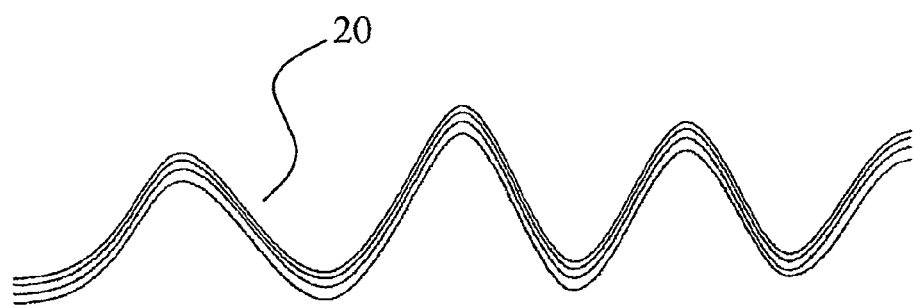
FIG. 3 shows how the impulse response image changes when the object is moving during the sampling window.

FIG. 3 shows how the schematic impulse response image of FIG. 2 is altered when the direct path signal is removed (as explained above) and the hand is waved in front of the transducer setup. The lines 20 remain continuous, but now have a corresponding profile. The positive gradients in the lines 20 represent movement towards the receiver and the negative gradients represent movement away.

There are many different ways in which the impulse response images can be analysed automatically to determine the presence or motion of an object in the imaging field. An explanation of the use of line filters for doing this will now be given.

A line filter is an algorithm which is applied to the impulse response images and which suppresses parts of the image which do not lie on a straight line of given gradient, i.e. it enhances parts of the image which do lie along the line relative to the rest of the image. The line filter has a roll-off at its edges rather than a sharp boundary. Furthermore each column of the filter mask is convolved with a sin c function representing the bandwidth of the transmit signal. This combines information from neighbouring lines to extract a more visible line.

Figure 4A:
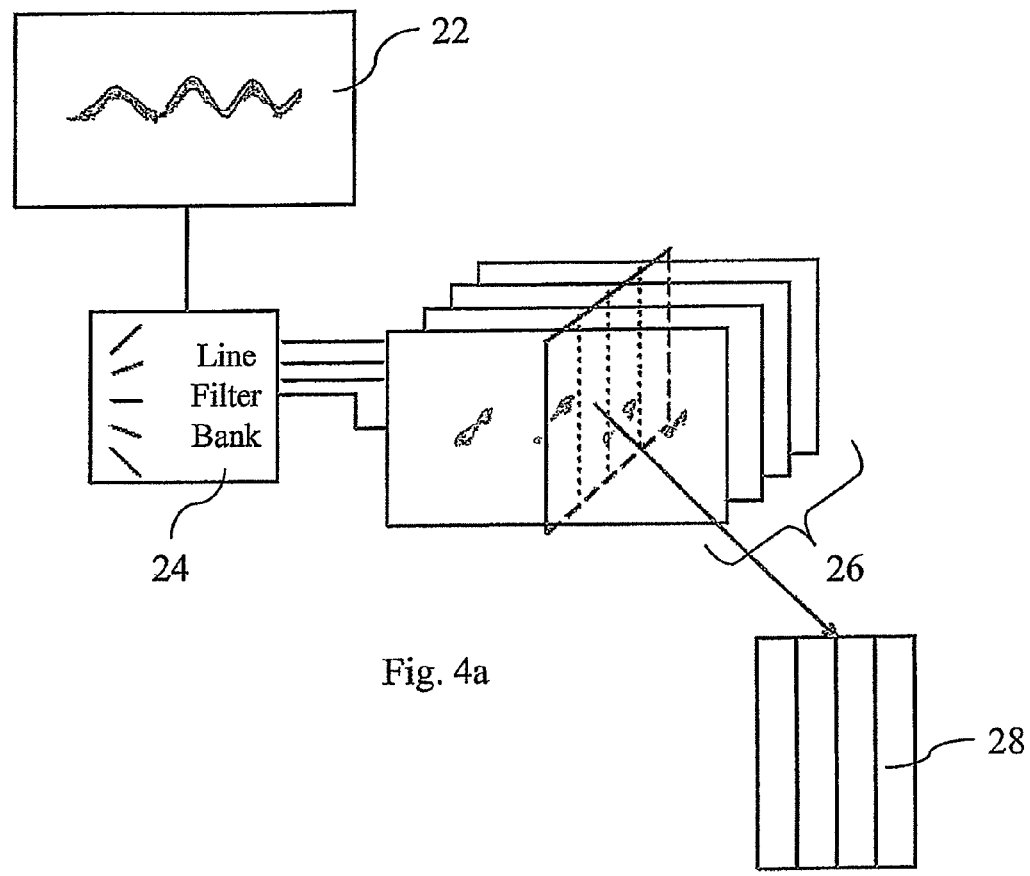
FIG. 4a is a schematic illustration of how a particular movement can be identified across a number of frames.
Figure 4B:
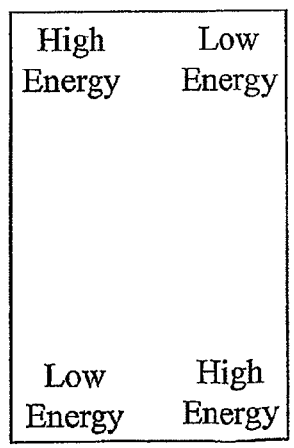
FIG. 4b shows the energy distribution for a certain movement.
Figure 4C:
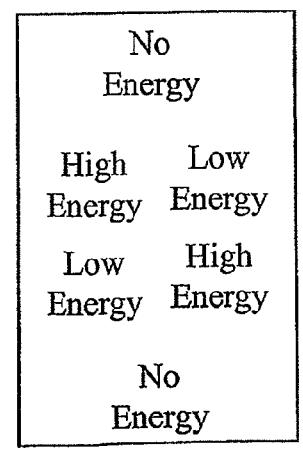
FIG. 4c shows the energy distribution for a variation of the movement.

FIGS. 4a to 4c show one way in which the image of FIG. 3 might be analysed. The impulse response image 22 is sent through a filter bank 24 to produce a set of line-filtered images 26, one for each filter applied. Of course each of the filtered images is different as each filter picks out different parts of the original image.

For a given time-step t, that is to say at a given horizontal position along each of the filtered images 26, a "slab" cutting through the whole set of images is taken out and collected in a matrix 28 referred to below as Z(t). Z(t) is arranged so that the leftmost columns correspond to line filtered impulse response images 26 for which the line in the line filters tilt sharply upwards (the uppermost line in the filter bank 24), whereas the rightmost columns correspond to line filters for which the lines tilt sharply downwards (lowermost line on the filter bank 24). The intermediate columns are representative of intermediate line filters applied to the impulse response image 22.

This representation is useful for detecting specific motional tendencies. If, for instance, the matrix Z(t) has a broad layout like that indicated in FIG. 4b, it indicates that in the upper part of the scene, i.e. representative of objects which are close to the transmitter/receiver (TX/RX) setup, the motion of these objects is towards the TX/RX setup. In the lower part of the image, representative of objects far away from the TX/RX, setup the objects are moving away from the TX/RX. The situation could also be more localized, as illustrated by FIG. 4c. Here, there is not much going on very close to or very far away from the TX/RX setup. In the middle however, there is an object moving closer to the TX/RX setup and one slightly further away which is moving further away. This can be detected using a filter F on the matrix Z(t), denoted by $$w(t)=Z(t)*F \quad \text{(Eq H)}$$

Where F is a two-dimensional mask, typically being identical with the centre part of the layout shown in FIG. 4c except with its columns and rows flipped. This technique is known as matched filtering. Typically, F will have the same number of columns as Z(t), thereby making the legal part of the convolution output a single column vector. Each element in this column vector contains a score, indicating the degree of presence of the expected gesture. Cleary, a full bank of filters could be used to detect variations of the same gesture, or to separate between more gestures. Furthermore since Z(t) is a result of the (raw) filtering of an impulse response image filtered with various line filters, it might be advantageous to compute the envelope of this matrix, as the values themselves will tend to fluctuate quickly between positive and negative values. Such envelope extraction can be accomplished by computing $$w(t)=(|Z(t)|*B)*F \qquad (\text{Eq I})$$

Where |.| is the operator extracting the absolute values in the matrix and arranging them in a corresponding matrix, i.e. the element-by-element absolute value operator, and B is a two- or one-dimensional mask, which could be Gaussian. If B is a two-dimensional mask, it will blur impulse response images filtered by similar line filters, thereby indicating a lack of discrimination between similar lines, which might be better for some applications. If B is a one-dimensional vertical mask, this does not happen. Other filtering means, such as envelope extraction by means of Laplace transformation could also equally well be applied.

The above-described 'motion filter' approach extends beyond their use upon matrices Z(t) stemming from line-filtered impulse response images. If the background data was not impulse response images, but instead two-dimensional or three-dimensional images, created by inversion or otherwise, the filter masks B and F would be 3-way or 4-way filter masks, representing filtering in 2 or 3 spatial dimension and one temporal dimension. This variant might be useful for detecting situations which cannot readily be identified by considering impulse responses from a single TX/RX channel, such as the direction of rotation of an object in 3-dimensional space, or detecting the exact axis along which a finger-separating motion occurs. Clearly also, the filter mask F does not have to be a linear filter, and the convolution operator "*" isn't limited to denoting a linear filter operation. Non-linear filters, or combinations of filters could be used, such as max/min or mean filters. Various local combinations of filters, such as extracting the maximum value in the upper part of a window and the minimum value in the lower, could be used. Furthermore, the filtering operation could be carried out using any linear or non-linear extraction of the underlying data material; the element-by-element absolute value |.| operator being just one example.

In addition to or instead of the line filters, edge filters may be included in filter bank 24. An edge filter is an algorithm which is applied to the impulse response images and which suppresses parts of the image which do not lie on the edge of a straight line of given gradient, i.e. it enhances the edges of lines within the image that are parallel with the filter. This may be implemented as threshold rate of intensity change along a gradient perpendicular to that of the edge filter's gradient. This can be useful for tracking the periphery of an object; in particular the leading or trailing edge or surface of an object as it approaches or recedes from the transmitters/receivers. In some situations, it may be helpful to apply non-directional edge or line filters, which pass edges or lines of any orientation.

FIG. 5 is a schematic representation of the impulse response image corresponding to two objects moving apart, swapping sides and then swapping back to their original configuration. It can be seen therefore that the set of parallel lines at the left-hand edge of the image diverge at point A as the objects start to move apart in the 'time-of-flight' direction. A given time of flight and the (usually physically separated) transmitter and receiver between them define an ellipse with the transmitter and receiver at the two focuses. The movement that is detected is the component of actual movement along a line joining the object and the centre of the ellipse. This can be thought of as the time-of-flight direction.

The two objects then move together again and swap sides so that they are separated again at point B. Thereafter they are swapped over again to their original positions (point C) where they remain stationary and so the lines are once more horizontal.

FIG. 6a shows the impulse response image of FIG. 5 after a line filter has been applied. As can be appreciated the resulting image is much easier for software to decipher. The patterns of energy highlighted by the filter (and similar filters with different slopes that might be applied) can be interpreted by an algorithm that looks for energy in the expected places.

FIG. 6b shows the impulse response image of FIG. 5 after an edge filter has been applied. As with the line filter, the patterns of energy highlighted by the edge filter can be interpreted by an algorithm that looks for energy in the expected places.

FIG. 7 shows the impulse response image corresponding to a 'thumb-click': that is a hand with one index finger touching the table slightly in front of the others, moving on the table. In the parts where the upper part of the image is flat 30, 32, the front finger stays still but the motion of the thumb 34, 36 relative to the rest of the hand can be seen.

FIG. 8a shows an illustration of two fingers moving apart. 38 shows the curve of the front-most finger, 40 points to situations where one can hardly see another finger moving in the other direction. 42 shows some heavy lines which are continually present in the picture—they represent peak values in the impulse response relating to the "rest of the hand", which is more or less standing still while the two fingers move. The separation and the detection thereof could be taken as a signal to the computer to zoom in an image, or to grab an object (pinching together) or releasing an object (separating the fingers).

FIG. 8b shows the impulse response image of FIG. 8a but with most of the horizontal lines (corresponding to stationary elements) having been removed by a suitable filter. Now both the up and down movement are visible.

FIG. 8c shows the impulse response image after applying suitable line filters. The motions of interest are clearly visible, having been extracted from the very confused original impulse response image (FIG. 8a).

These simple examples show that embodiments of the invention allow relatively complex gestures to be automatically interpreted using a simple energy pattern-matching algorithm. The approach described above is not analytically tracking the individual fingers (and so has a much lower requirement for resolution and computing power than such tracking would do) and it has a high degree of tolerance to factors like the distance of the hand from the transducers, the speed of movement, the shape and orientation of the hand, and even the presence of other objects in the imaging field. It should be appreciated however that should it be necessary or desirable the principles of the invention can also be applied to separating the movement of individual objects such as fingers so that they can be tracked.

Considering the line-filter approach set out above more analytically, line filters can be used generally to determine the presence of a reflector at position x(t) moving in a spatial direction Δx(t).

If it is postulated that there exists a reflector at point x(t) moving in space with direction Δx(t), the next point in space will be:

$$x(t+1)=x(t)+\Delta x(t)$$

assuming a locally linear motion. Both x(t) and x(t+1) give rise to distance-of-flights $\{d_k(t)\}$ and $\{d_k(t+1)\}$ for each transmitter/receiver pair, i.e. for each channel, k. The change in time delay from $d_k(t)$ to $d_k(t+1)$ for a specific channel k aligns with a line in the impulse response image, having the angle $$\alpha_k = \tan^{-1}\{d_k(t+1) - d_k(t)\}$$

Hence, a way to test whether the reflector located in x(t) is actually moving in the direction Δx(t), is to check each of the impulse response images, $Z_1, Z_2, \ldots Z_K$, each image $Z_k$ being filtered with a line filter having a line with inclination angle $\alpha_k$, to see whether it has high energy in the column corresponding to the time index t.

Letting:

$$W_k = F(Z_k, \alpha_k)$$

denote the filtering of the image $Z_k$ with a line filter having an angle of inclination equal to $\alpha_k$, it must be checked whether the images $W_1, W_2, \ldots, W_K$ have high energy in the column corresponding to the time index t. To be precise, letting $W_k(t, d)$ denote the value of the filtered image $W_k$ corresponding with the t'th time frame and the travel time d (in samples) between the transmitter, the possibly reflective point and the receiver. Then, a test observer for the test could be $$z\{x(t), \Delta x(t)\} = \sum_{i=1}^{K} W_k(t, d_k(t))$$

If this score is high, then there is a high probability that there is a reflective object in the position x(t), moving with the direction Δx(t). To find the underlying distribution for the test observer, the distribution of z{x(t), Δx(t)} could be sampled in 'empty areas' of the acoustic scene.

Clearly, once an initial position $x(t_0)$ has been found, this test could be used to track an object throughout the scene, since a test can be conducted as to where the point has moved from one frame to the next. To improve tracking quality, one could at each stage try out a limited number of different Δx(t)'s, i.e. only the ones that correspond with a reasonable guess at a possible physical motion. Clearly, the acceleration cannot be infinite from time-step to time-step.

The tracking process could also be applied to a neighbourhood of points $\{x_i(t)\}$, thereby improving the robustness of the tracking process, particularly for reflectors which are not represented as point reflectors within the frequency band of the system. The possible set of reflective points $\{x_i(t)\}$ could be related to prior knowledge of the object being tracked, e.g. they could represent the model of a hand or a set of fingers say by specifying that fingers can only bend in certain directions. Such a model does not need to be static, it could be a flexible model such as an active shape model, a statistical shape model, an active appearance model, a snake or an 'active blob'. Such motion model tracking in the impulse response domain allows more accurate tracking of particular objects. It could also be applied in 2D or 3D imaging domains.

An advantage of using the aforementioned approaches over the state-of-the art, is that multiple reflective points could be tracked in the scene simultaneously—even if these give rise to the same times-of-flight or channel delays in one or more of the channels. This follows since the corresponding overlapping curves are 'resolved' by using the line filters. In particular, since when tracking one object, only a narrow range of Δx(t)'s are tested out for the motion of a particular object, two objects can more often than not 'cross' each other's path without causing confusion as to which object belongs to which sequence of times-of-flights. This is an advantage when tracking multiple hands, fingers, styluses or objects within the scene.

A further advantage of the use of line filters, is that effectively they allow separation of the impulse response image energy of an object that has a physical 'direction' in space from that of general noise. When detecting the presence and the initial position of an object in the acoustic scene, this is important, since without using this motion information filtering, a tracking system could easily give a false-positive indication of the presence and the position of a reflector in the scene. In particular, one might want to track a finger standing out from a hand, i.e. being closer to the TX/RX setup than the rest of the hand. As the hand, with the finger pointing out, moves into the acoustic scene however, the motion of the finger will not normally differ a lot from that of the hand. Therefore, the motion information could effectively be used for the purpose of segmentation, i.e. to identify (the whole of) an object moving in a specific direction and velocity. The detection of an object of a certain size, identified as a moving segment, could be taken as a cue to start tracking. This could, for instance, make it possible for the system to discern between a hand, a finger, or a smaller or a bigger object being inserted into the acoustic scene. Another benefit is that it could help locating the exteriors of the object being moved into the scene, such as the finger tip. The finger tip could then be defined as the front-most part of the segment, the segment again being defined as the collection of points moving with a specific direction and speed.

In some embodiments of some aspects of the invention the techniques described earlier for motion separation can be applied to three-dimensional images of the scene formed e.g. by delay-and-sum imaging. The principle behind this technique is to estimate the reflectivities of points in a 3-dimensional grid. These grid points then effectively become a representation of the 3-dimensional scene, so that the grid points are related to 'voxels' (3-dimensional equivalents of pixels in 2D-imaging) of the 3-dimensional image.

To explain how delay-and-sum imaging works, it is first assumed that there are N spherical receivers, located in positions $r_1, r_2, \ldots r_N$ and a single transmitter located at the origin (clearly the concept can be extended to cover the possibility of using more than one transmitter). The objective is to compute 'voxel' values at various points in space $x_1, x_2, \ldots x_Q$, i.e. values indicating the reflectivities at these points. The impulse responses are recorded/computed at the respective receivers, either through a pulse emission by the transmitter, or computed by other means, as described previously; these are defined as $i_1(s), i_2(s), \ldots i_N(s)$.

Now, a check can be made whether or not, and to what extent, there is a reflective point located at a position $x_k$.

The distance that would be traveled by an acoustic signal from the transmitter at the origin to the postulated reflective point $x_k$ and then to the receiver $r_j$ is given by:

$$d_{jk} = \|x_k\| + \|x_k - r_j\|$$

If there is indeed a reflector at the chosen point, this distance should then match with a 'peak' in the impulse response for any given receiver j. The working hypothesis for the presence of a reflector is that "if (a) a pulse was sent at time zero, and (b) it bounced off a reflector located in $x_k$, then, at given times after the sound hit the reflector, each of the receivers would detect a burst of energy". The distances can be converted to timings (measured in numbers of samples) by multiplying by f/c where f is the sampling frequency and c the speed of sound.

In other words the value of the expression $$i_j\left(\frac{f}{c} \times d_{jk}\right)$$

should be large value for any j, since the impulse response simply measures how much energy was received at any given sampling point in time. The multiplication by f/c simply converts the travel distance d into a sample index in the impulse response. Hence, an estimate of the reflective capacity in the point $x_k$ would be $$E_k = \sum_{j=1}^{N} i_j\left(\frac{f}{c} \times d_{jk}\right)$$

Having computed the reflective capacity values or 'voxel' intensity values $E_1, E_2, \ldots E_Q$ corresponding with the points $x_1, x_2, \ldots x_Q$, the delay-and-sum imaging is complete. Clearly, the choice of sampling points will be important for the quality of the imaging, as will the positioning of the respective receivers (and/or transmitters). The signal bandwidth is also important in order to minimize the effect of 'sidelobes' and 'grating lobes' which could be problematic if an under-sampled array were to be used.

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

The invention claimed is:

1. A method of tracking an object in the presence of one or more other objects in an imaging field comprising transmitting energy into said imaging field, receiving reflected energy from the imaging field, calculating a series of impulse responses at successive time intervals using said transmitted and received energy wherein the received energy is a convolution of the transmitted energy and the impulse responses, and separately identifying and isolating a subset of said impulse responses corresponding to a continuous motion.

2. A method as claimed in claim 1 wherein the transmitted energy is intermittent.

3. A method as claimed in claim 1 comprising analysing said impulse responses in the frequency domain.

4. A method as claimed in claim 1 comprising analysing the amplitude spectrum of said impulse responses in the frequency domain.

5. A method as claimed in claim 1 comprising determining changes in the frequency spectrum of said impulse responses over time.

6. A method as claimed claim 1 comprising analysing said impulse responses in the frequency domain and determining therefrom that an object is or has been changing its shape.

7. A method as claimed in claim 1 wherein the one or more objects includes a human hand or part thereof.

8. A method as claimed in claim 1 comprising tracking an object and controlling an electronic device in response to said tracking.

9. A method as claimed in claim 1 comprising tracking the movement of a user's finger and controlling a cursor on a device with a graphical user interface in response to said tracking.

10. A method as claimed in claim 1 comprising detecting two of a user's fingers moving together or apart.

11. A method as claimed in claim 1 wherein said signals are ultrasonic signals.

12. A method of controlling at least one operation of an electronic device using a method as claimed in claim 1.

13. A method as claimed in claim 1 further comprising storing results in a memory.

14. A method as claimed in claim 1 further comprising providing a display signal for a display device.

15. A method as claimed in claim 1 further comprising providing a control signal for an external device.

16. A method as claimed in claim 1 comprising removing a contribution of background reflections from the impulse responses.

17. A method of tracking an object in the presence of one or more other objects in an imaging field comprising transmitting energy into said imaging field, receiving reflected energy from the imaging field, calculating a series of impulse responses at successive time intervals and selecting a subset of said impulse responses corresponding to a continuous motion, further comprising detecting two of a user's fingers moving together or apart, wherein said movement together or apart is identified from different direction movements in respective halves or portions of said matrix.

18. A method as claimed in claim 1 comprising detecting a change of shape of an object in the time domain.

19. A method as claimed in claim 18 wherein said step of detecting a change of shape comprises monitoring for a predetermined deformation in the impulse responses.

20. A mobile device comprising an ultrasonic transmitter and separate/integrated ultrasonic receiver, said device being configured so that at least one operation thereof is controlled by determination of the movement of a user's hand in accordance with a method as claimed in claim 1.

21. A method of determining movement of one or more objects in an imaging field comprising:
   transmitting a continuous or discontinuous transmit signal;
   receiving a plurality of receive signals;
   calculating a plurality of channel impulse responses using said transmit and receive signals, wherein the receive signals are convolutions of the transmit signals and the channel impulse responses;
   defining a matrix of impulse responses, with impulse responses for respective time intervals adjacent one another; and
   isolating from said matrix a pattern corresponding to a motion of one of said objects.

22. A method as claimed in claim 21 wherein the one or more objects includes a human hand or part thereof.

23. A method as claimed in claim 21 comprising detecting a change of shape of an object in the time domain.

24. A method as claimed in claim 21 wherein said signals are ultrasonic signals.

25. A method of controlling at least one operation of an electronic device using a method as claimed in claim 21.

26. A method as claimed in claim 21 comprising removing a contribution of background reflections from the impulse responses.

27. Apparatus for tracking an object in the presence of one or more other objects in an imaging field comprising:
- transmission means arranged to transmit energy into said imaging field;
- receiving means arranged to receive reflected energy from the imaging field; and
- processing means arranged to calculate a series of impulse responses at successive time intervals using said transmitted and received energy wherein the received energy is a convolution of the transmitted energy and the impulse responses, and to select a subset of said impulse responses corresponding to a continuous motion.

28. Apparatus as claimed in claim 27 wherein said signals are ultrasonic signals.

29. An electronic device comprising an apparatus as claimed in claim 27 for controlling at least one operation thereof.

30. A non-transitory computer readable medium bearing software configured, when run on a computer, to track an object in the presence of one or more other objects in an imaging field, the software having inputs for energy transmission and reflected energy reception and further comprising logic arranged to calculate a series of impulse responses at successive time intervals using said transmitted and received energy wherein the received energy is a convolution of the transmitted energy and the impulse responses, and to separately identify and isolate a subset of said impulse responses corresponding to a continuous motion.

31. A method of recognising motion of a human hand comprising:
- transmitting a plurality of transmit signals in respective time frames;
- receiving a plurality of receive signals, at least some of said receive signals being reflected from said hand;
- determining a plurality of channel impulse responses using said transmit and receive signals wherein the receive signals are convolutions of the transmit signals and the channel impulse responses;
- removing a contribution of background reflections from the impulse responses;
- defining a matrix of impulse responses, with impulse responses for adjacent time frames adjacent each other; and
- analysing said matrix for patterns corresponding to movement of said hand.

* * * * *